United States Patent [19]

Sato

[11] Patent Number: 5,122,819
[45] Date of Patent: Jun. 16, 1992

[54] EXPOSURE DEVICE FOR COLOR CRT MANUFACTURE AND A COMPOUND CORRECTIVE LENS THEREFOR

[75] Inventor: Kiyohiko Sato, Nagaokakyo, Japan

[73] Assignee: Mitsubishi Denki Kabushiki Kaisha, Tokyo, Japan

[21] Appl. No.: 777,507

[22] Filed: Oct. 18, 1991

Related U.S. Application Data

[63] Continuation of Ser. No. 552,095, Jul. 13, 1990, abandoned.

[30] Foreign Application Priority Data

Aug. 4, 1989 [JP] Japan .................................. 1-203164

[51] Int. Cl.⁵ .............................................. G03B 41/00
[52] U.S. Cl. ...................................... 354/1; 359/601; 359/741
[58] Field of Search ..................... 354/1; 359/741, 742, 359/743, 601

[56] References Cited

U.S. PATENT DOCUMENTS 3,828,358  8/1974  Miyaoka ................................. 351/1

FOREIGN PATENT DOCUMENTS 54-10659  1/1979  Japan .

Primary Examiner—L. T. Hix
Assistant Examiner—Howard B. Blankenship

[57] ABSTRACT

A compound corrective lens for use in light exposure in the manufacture of color CRTs includes plurality of lens elements, each having an elementary surface, formed in combination a compound surface on the exit side of the lens, with steps formed at the boundaries between adjacent lens elements to connect edges of the elementary surfaces of the adjacent lens elements. The surfaces are so arranged that the steps falls from the elementary surface on the inner side closest to the optical axis of the lens) to the elementary surface on the outer side (farthest from the optical axis). With such an arrangement, the adverse effect of the steps covered with a light-absorbing layer is reduced. That is, the effective areas of the elementary surfaces are enlarged, and thus the distortion of the lens surface is suppressed.

15 Claims, 4 Drawing Sheets

EXPOSURE DEVICE FOR COLOR CRT MANUFACTURE AND A COMPOUND CORRECTIVE LENS THEREFOR

This application is a continuation of application Ser. No. 07/552,095 filed on Jul. 13, 1990, now abandoned.

FIELD OF THE INVENTION

The invention relates to a light exposure device for use in lithography in the manufacture of CRTs, and more specifically to compound corrective lens for the light exposure device. The device is especially related to compound corrective lenses for light exposure devices used to create tricolor fluorescent dot patterns on the inner surface of face panels of shadow-mask type color CRTs.

BACKGROUND OF THE INVENTION

Tricolor fluorescent dot patterns are formed on the inner surface of a color cathode ray tube (hereinafter referred to as "CRT") by means of lithography. The light exposure in this lithography is conducted using a light exposure device. In this light exposure device, the exposure light ray is made to assume the same path as the path which the electron beam will assume when the manufactured CRT is in operation.

FIG. 3 is a simplified frontal view of a typical light exposure device for the manufacture of color CRTs. As illustrated, a support frame 1 comprises a left support wall 1a and a right support wall 1b. Support platforms 2a, 2b, 2c, and 2d are connected to support frame 1 at specific vertical spacings. A light source 4 is secured to the top of support platform 2a through a mounting fixture 3. Inside of a case 4a of a light source 4 is a linear light source 5, such as a linear very-high-pressure mercury lamp, and a light-transparent slit 7, having a regulator window 7a that regulates a radiation angle of an exposure light ray 6' radiated from linear light source 5.

A light intensity correction filter 8 is mounted on support platform 2b.

A pair of compound corrective lenses 9 and 10 are mounted on support platforms 2c and 2d, respectively, in such a way that the positions of these two lenses may be adjusted. The corrective lenses 9 and 10 have a function of deflecting light and serve to make the path of the exposure light ray as close as possible to the path of the electron beams of the manufactured CRT.

A color CRT face panel 11 is placed, inside-surface down, and substantially at the center of support platform 2e. A photo-sensitive layer 12 on the inside of face panel 11 is created by first applying a slurry containing a fluorescent substance dispersed in a photo-sensitive resin and then drying. A shadow-mask 13 is placed at a specific distance from and in opposition to photo-sensitive layer 12. Shadow mask 13 is detachably fit on face panel 11.

In the above configuration, the radiation angle of exposure light ray 6 from linear light source 5 is regulated at regulator window 7a of light-transparent slit 7. Light intensity is corrected at light intensity filter 8. Furthermore, exposure light ray 6 is corrected to coincide with a path of an electron beam by compound corrective lenses 9 and 10, passes through shadow mask 13, and strikes photo-sensitive layer 12 on the inside surface of face panel 11. Photo-sensitive layer 12 is thereby exposed.

As the compound corrective lenses 9 and 10, lenses having multiple lens elements, each of which has a single continuous surface, are used. These compound corrective lenses 9 and 10 thereby have compound surfaces. More specifically, the compound lens has its surface divided into a plurality of regions, and in each region the surface is continuous, either flat or curved. Along the boundaries between adjacent regions, the surface is discontinuous and there are steps at these boundaries. Each of the regions is formed of a lens element having a single continuous surface which is either flat or curved.

FIG. 4 shows an area of a prior-art compound corrective lens used in a light exposure device as described above. In the illustrated example, a lens element $10a'$ toward the outside (farther away from center of the compound lens) is thicker than an adjacent lens element $10b'$ toward the inside. The exposure light beam 6 is thereby blocked by a light absorbing layer 15 formed on the step at the boundary between the lens elements $10a'$ and $10b'$ (the light absorbing layer 15 is formed to avoid emission of a light ray which has passed through (and is refracted at) the surface of the step). As a result, a relatively large unexposed region 12a is formed on photo-sensitive layer 12. For this reason, toward the outer boundary of each lens element (i.e., the boundary of each lens element with the adjacent lens element on the outer side), there is an area which is not utilized for the correction of the path.

Thus, the effective surface area of the lens element is reduced. This limits design flexibility (degree of freedom), requires the use of lens elements having curved surfaces that may be hard to manufacture, and makes setting of lens elements more difficult.

SUMMARY OF THE INVENTION

The invention seeks to solve these problems of the prior art, and, has as one of its purposes, providing a compound lens which has an increased effective surface area of a lens element, and which allows an increased degree of freedom for the design of curved surfaces of lens elements.

A compound corrective lens of the invention in a light exposure device for the manufacture of color CRTs comprises a plurality of lens elements, each having an elementary surface forming, in combination, a compound surface on an exit side of the lens, with steps formed at the boundaries between adjacent lens elements to connect edges of the elementary plurality of elementary surfaces of said adjacent lens elements. The surfaces are so arranged that the steps sequentially fall from the elementary surface of the lens element closest to the optical axis of the lens, to the elementary surface of the lens element farthest from the optical axis.

Because of the above arrangement, an effective surface area of a curved surface of each lens element is increased.

DETAILED DESCRIPTION OF THE PREFERRED EMBODIMENTS

One embodiment of the invention will now be described with reference to the Figures.

Figure 3:
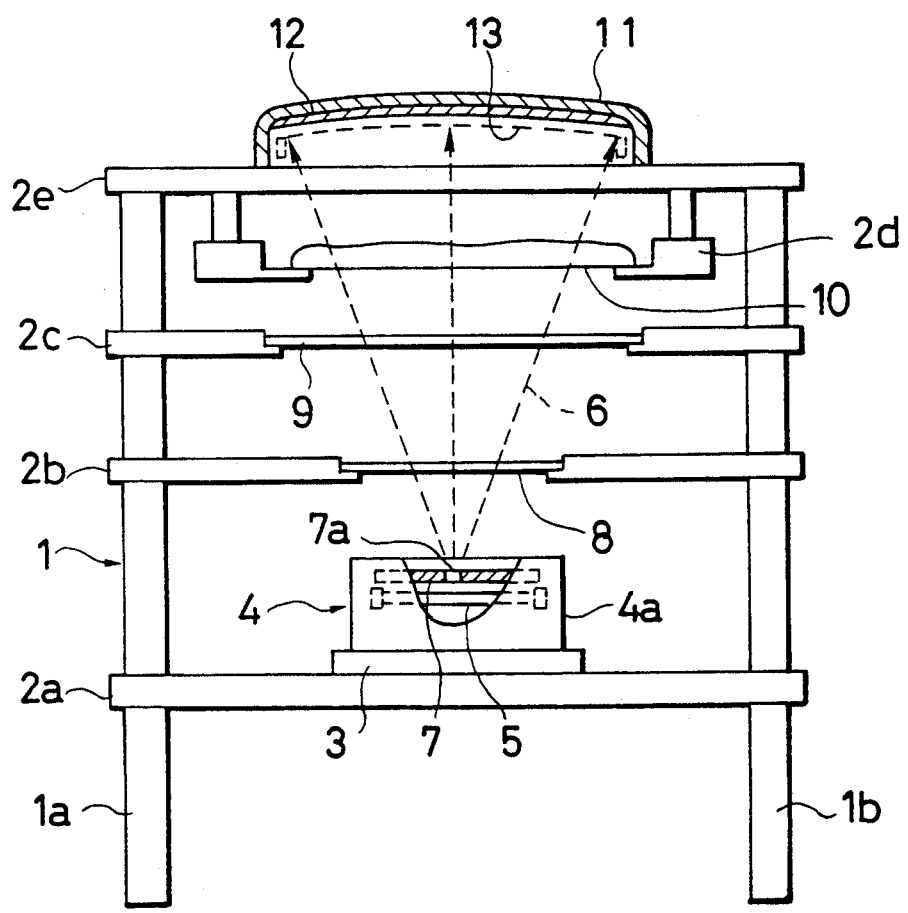
FIG. 3 is a front view of a typical light exposure device for the manufacture of color CRTs.

The overall structure of the light exposure device of an embodiment according to the invention is identical to that shown in and described with reference to FIG. 3.

Figure 1:
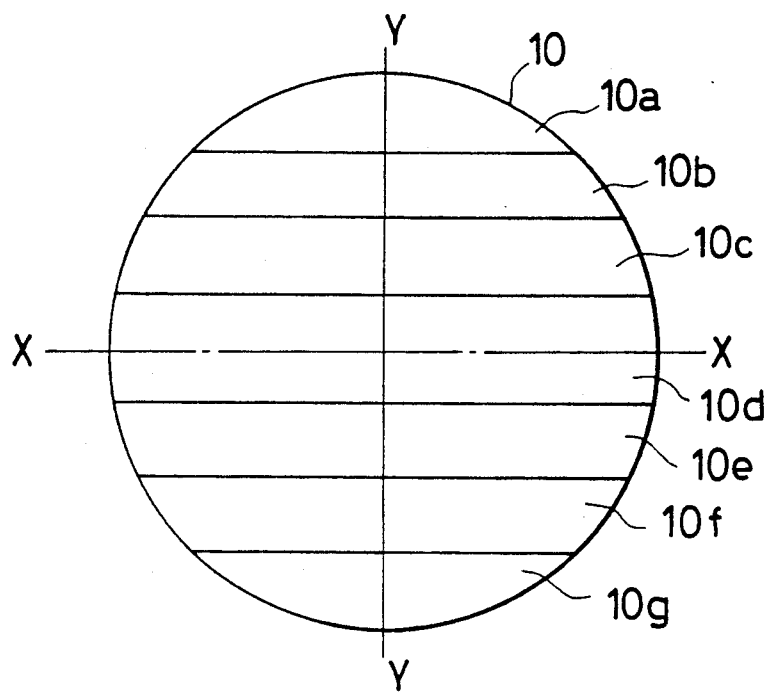
FIG. 1 is a top view of a compound corrective lens in a light exposure device for the manufacture of color CRTs, embodying the invention.
Figure 2:
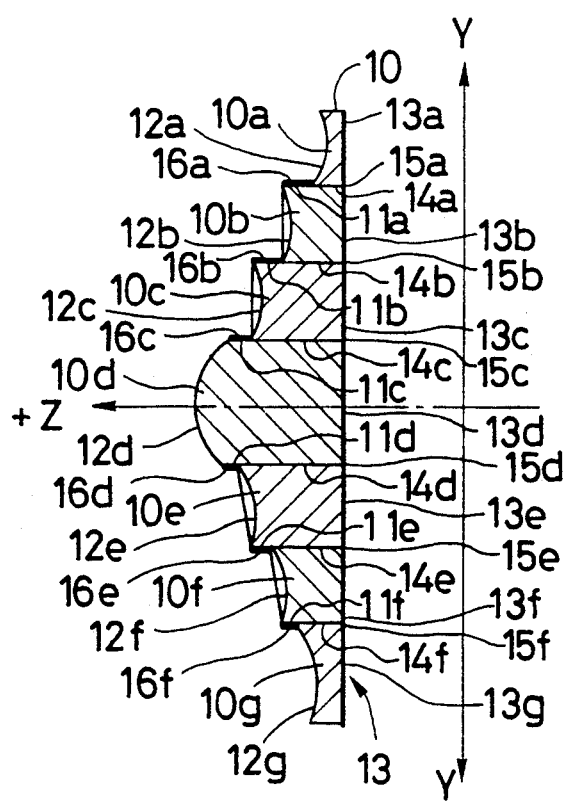
FIG. 2 is a sectional view across the x- and z-axes of the compound corrective lens of FIG. 1.

FIG. 1 is a top view of a compound corrective lens 10 according to the invention as utilized in the light exposure device for the manufacture of color CRTs. FIG. 2 is a sectional view across the x- and z-axes of the compound corrective lens of FIG. 1. Axis z in the Figures is also the optical axis of the compound lens. The positive z-axis points toward the face panel.

In FIG. 2, the right side is the incident side which faces the light source when the compound lens is assembled in the exposure device, and the left side is the exit side which is opposite to the light source when the compound lens is assembled in the exposure device.

In these Figures, a compound corrective lens 10 comprises lens elements 10a through 10g, having elementary surfaces 12a to 12g each of which consists of a single continuously-curved surface and which, in combination, form a compound surface on the exit side of the lens. The compound surface includes steps 11a to 11f at the boundaries between all pairs of adjacent lens elements to connect edges of the elementary surfaces 12a to 12g of the adjacent lens elements.

The elementary surfaces are so arranged that the steps sequentially fall from the elementary surface of the lens element (e.g., 10c) closest to the optical axis z of the lens to the elementary surface of the lens element (e.g., 10b) farthest from the optical axis.

The surface 13 of the compound lens on the incident side of the lens, which is the assembly of the elementary surfaces 13a to 13g of the lens elements on the incident side of the lens, is continuous and flat.

In the illustrated embodiment, the compound corrective lens 10 consists of multiple regions divided along lines parallel with each other, and parallel to one (axis x) of the orthogonal axes (axis x and axis y) which are orthogonal to the optical axis (axis z) of the lens. More specifically, the boundaries or joining surfaces 14a to 14f between the lens elements are flat surfaces parallel with each other, and parallel with the optical axis z of the compound lens. The boundaries 14a to 14f between adjacent lens elements extend parallel with each other, and the lens elements extend across the compound lens.

For all pairs of adjacent elements 10a to 10g joined at joining interfaces 14a to 14f between them, the one (e.g., 10c) farther from the optical axis of the lens is thinner than the one (e.g., 10b) closer to the optical axis z.

The steps are covered with opaque layers, which are light-absorbing layers 16a to 16f.

Compound lens 9 has a configuration similar to that of the compound lens 10.

Figure 4:
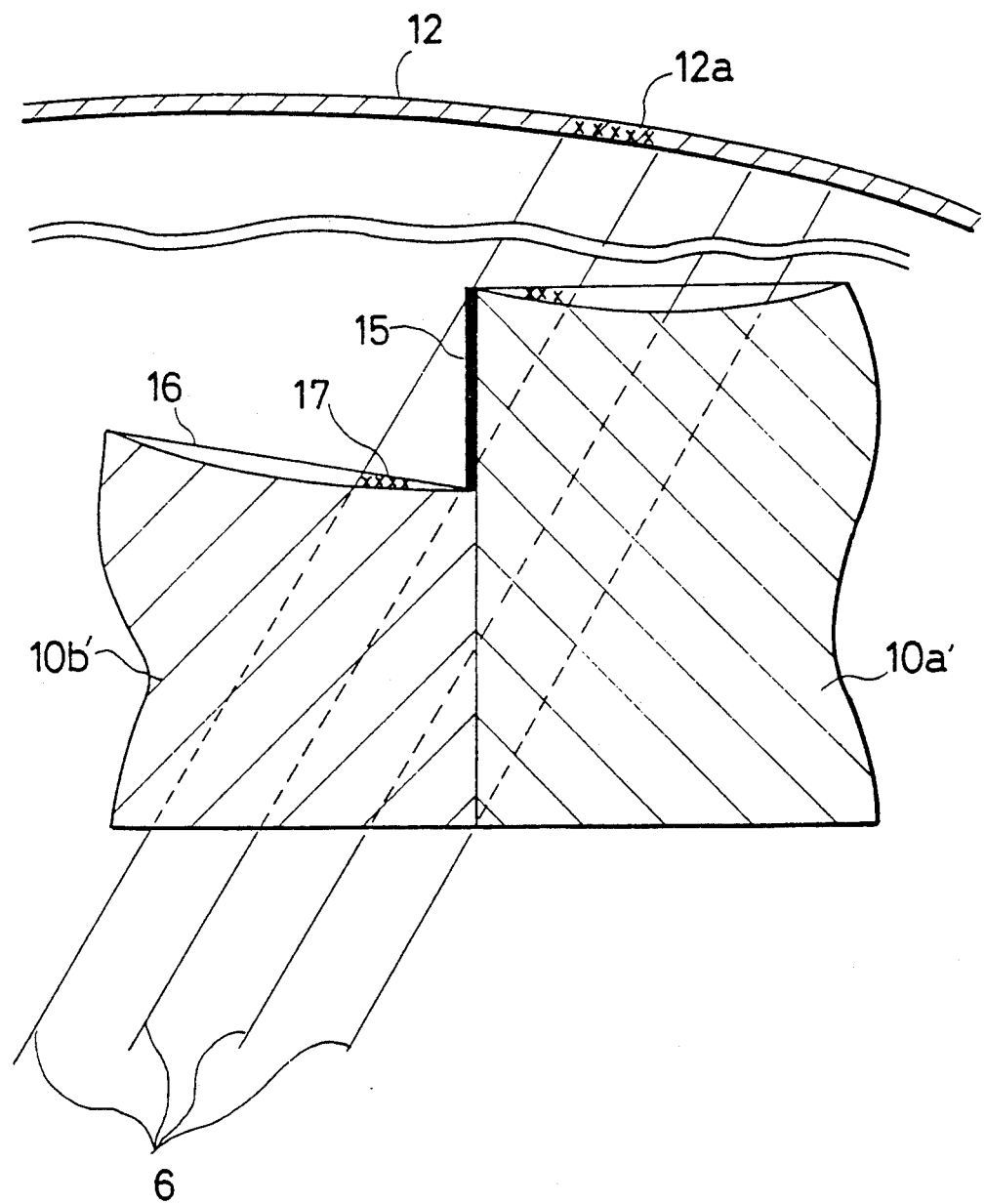
FIG. 4 is a partial sectional view of a prior-art compound corrective lens.
Figure 6:
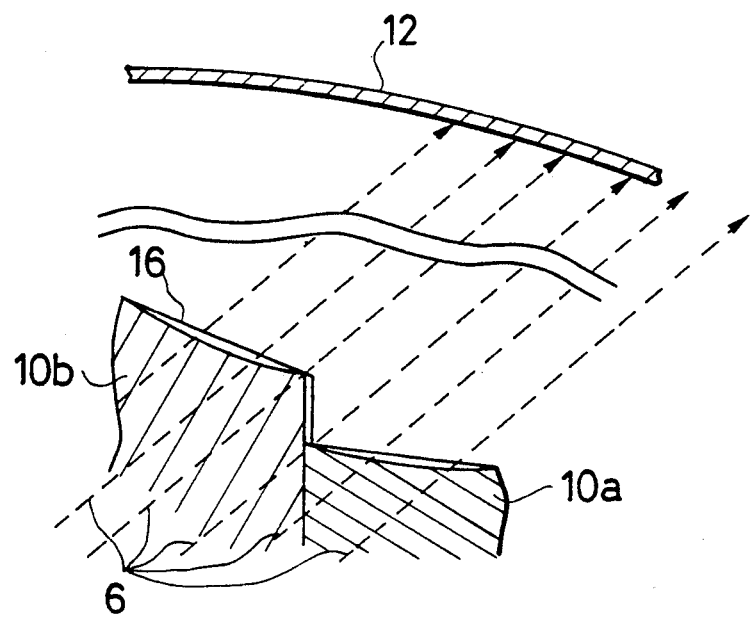
FIG. 6 is a diagram depicting paths of light rays when a compound corrective lens of the invention is used.

With this arrangement, exposure light ray 6 travels as shown in FIG. 6 (as opposed to the travel of exposure light ray 6 shown in FIG. 4), thereby allowing the entire inner curved-surface 16 to be utilized as a correction surface. As a result, the effective surface area of a lens element is increased. This thereby allows, as described before, distortion (roughness) of its corrective curved-surface to be suppressed.

Now the effect of enlarging the effective area on the elementary surface of each lens element of the compound lens is discussed.

The degree of corrective capability of a lens element is determined by the slope of the lens element surface at each point on a curved surface of that lens element (as demonstrated below), the larger the effective surface area of a lens element, the better the lens, less distortion (roughness) of its curved-surface.

Figure 5:
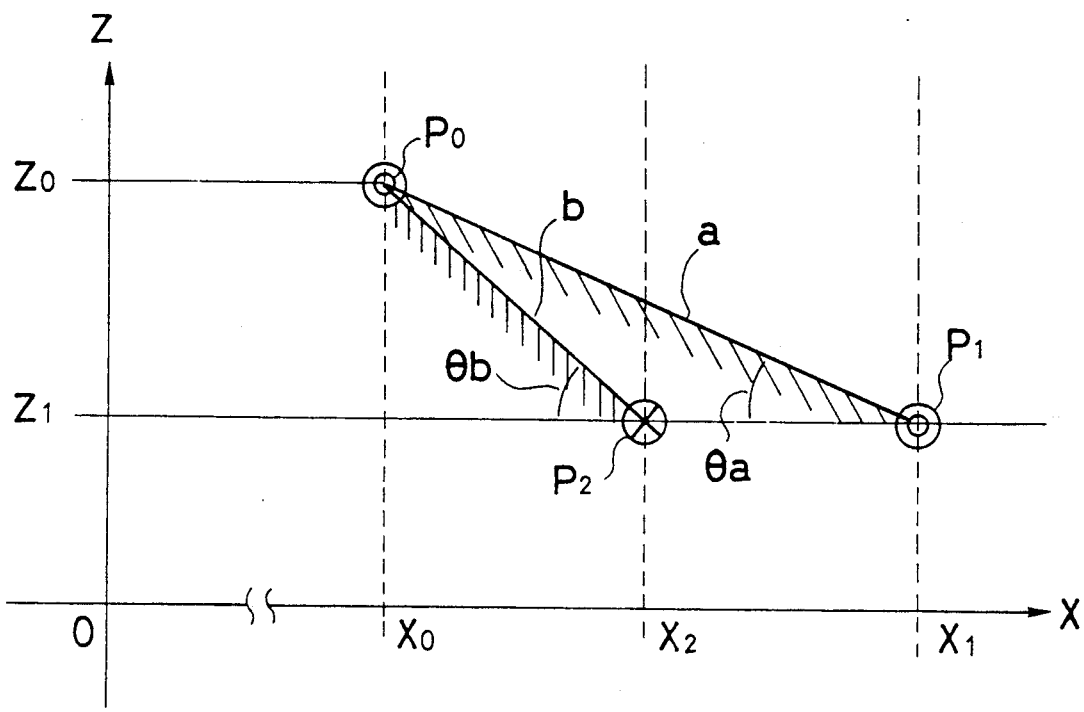
FIG. 5 is a chart showing a relation between effective surface area of a lens and slant of the lens surface.

FIG. 5 shows a view of an x-axis/z-axis planar section of a compound corrective lens. In the Figure, curve-a represents a curve of a lens element with a large effective surface area; curve-b represents a curve of a lens element with a small effective surface area. (For simplicity, curve-a and curve-b are depicted as continuous slopes (straight lines) in this explanation). The Figure is to be interpreted as follows:

The z-axis shows lens thickness;

Lens thickness at points $P_1$ and $P_2$ are equal (thickness = $z_1$)

$$|x_2 - x_0| < |x_1 - x_0|$$

$\theta_a$ is the slope of surface-a; $\theta_b$ is the slope of surface-b; Here, since $$|x_2 - x_1| < |x_1 - x_0|$$

and $$|z_0 - z_1| / |x_2 - x_0| > |z_0 - z_1| / |x_1 - x_0|$$

therefore $$\tan^{-1}(|z_0 - z_1| / |x_2 - x_0|)$$

$$> \tan^{-1}(|z_0 - z_1| / |x_1 - x_0|)$$

therefore $$\theta_b > \theta_a$$

From FIG. 5 and the above relations, it is seen that a lens element with a large effective surface area has a surface-a that is less distorted (rough).

As described above, the invention allows the effective surface area of a curved surface of a lens element to be increased by configuring lens elements, each having a single continuously curved surface, together comprising one compound corrective lens, and each occupying a region parallel to the x-axis of that compound corrective lens, in such a manner that an outer element is thinner than its inner element at the contact surface between the two.

Increasing the effective surface area of a curved lens-element surface in this manner suppresses distortion (roughness) of that surface and allows for the provision of easy-to-manufacture, easy-to-set compound corrective lenses.

What is claimed is:

1. A compound corrective lens for a light exposure device used in the manufacture of color cathode ray tubes, comprising:

a plurality of adjacent regions arranged in parallel in a first direction, each region including a lens element having a single continuously curved surface, wherein the plurality of adjacent lens elements monotonically decrease in thickness as distance from an optical axis of the lens increases.

2. The compound lens of claim 1, wherein a surface on an incident side of the lens is continuous.

3. A compound corrective lens for a light exposure device used in the manufacture of color CRTs, comprising:

a plurality of adjacent lens elements arranged in parallel in a first direction, each having an elementary surface forming, in combination, a compound surface on an exit side of the lens, with steps formed at the boundaries between adjacent lens elements to connect edges of the elementary surfaces of said adjacent lens elements, wherein the plurality of elementary surfaces are arranged so that the steps sequentially fall from the elementary surface of the lens element longest in a second direction, perpendicular to the first direction, and closest to the optical axis of the lens, to the elementary surfaces of the lens elements shortest in said second direction and furthest from the optical axis of the lens.

4. The compound lens of claim 3, wherein a surface on an incident side of the lens is continuous.

5. The compound lens of claim 4, wherein each of the boundaries are flat surfaces arranged in parallel.

6. The compound lens of claim 5, wherein the boundaries are arranged in parallel with the optical axis of the compound lens.

7. The compound lens of claim 3, wherein a surface on an incident side of the compound lens is flat.

8. The compound lens of claim 3, wherein said boundaries between adjacent lens elements extend parallel with each other and said plurality of lens elements extend from one edge to an opposite edge of said compound lens.

9. A light exposure device for use in the manufacture of color CRTs, comprising:

a light source;

a support frame for supporting a face panel of a color CRT at a position to receive light from said light source;

a compound corrective lens having an incident side facing said light source and an exit side facing said face panel for deflecting light from said light source to said face panel along a path identical to that of an electron beam which will travel when a manufactured color CRT is in operation;

said compound corrective lens including a plurality of lens elements arranged in parallel in a first direction, each having an elementary surface, forming, in combination, a compound surface on the exit side of the lens, with steps formed at the boundaries between adjacent lens elements to connect edges of the elementary surfaces of said adjacent lens elements, wherein the plurality of elementary surfaces are arranged so that the steps sequentially fall from the elementary surface of the lens element longest in a second direction, perpendicular to the first direction, and closest to the optical axis of the lens, to the elementary surface of the lens elements shortest in said second direction and furthest from the optical axis of the lens.

10. The device of claim 9, wherein a surface on the incident side of the lens is continuous.

11. The device of claim 9, wherein the boundaries are flat surfaces arranged in parallel.

12. The device of claim 11, wherein the boundaries are arranged in parallel with the optical axis of the compound corrective lens.

13. The device of claim 9, wherein a surface on the incident side of the compound corrective lens is flat.

14. The device of claim 9, wherein said boundaries between adjacent lens elements extend parallel with each other and said plurality of lens elements extend from one edge to an opposite edge of said compound corrective lens.

15. The device of claim 14, wherein the light source comprises:

a linear light source; and a light transparent slit having a regulating window, for regulating a radiation angle of an exposure light radiated from the linear light source.

* * * * *